(12) United States Patent
Wallendorf et al.

(10) Patent No.: US 9,751,131 B2
(45) Date of Patent: Sep. 5, 2017

(54) MACHINE FOR PROCESSING OPTICAL WORKPIECES, IN PARTICULAR PLASTIC SPECTACLE LENSES

(71) Applicant: Satisloh AG, Baar (CH)

(72) Inventors: Steffen Wallendorf, Wetzlar-Dutenhofen (DE); Holger Schäfer, Weilmünster (DE); Marc Savoie, Wetzlar (DE)

(73) Assignee: Satisloh AG, Baar (CH)

( * ) Notice: Subject to any disclaimer, the term of this patent is extended or adjusted under 35 U.S.C. 154(b) by 588 days.

(21) Appl. No.: 14/384,174

(22) PCT Filed: Jan. 24, 2013

(86) PCT No.: PCT/EP2013/000212
§ 371 (c)(1),
(2) Date: Sep. 10, 2014

(87) PCT Pub. No.: WO2013/135330
PCT Pub. Date: Sep. 19, 2013

(65) Prior Publication Data
US 2015/0047479 A1 Feb. 19, 2015

(30) Foreign Application Priority Data

Mar. 11, 2012 (DE) .......... 10 2012 004 543

(51) Int. Cl.
*B23B 5/00* (2006.01)
*B23B 5/36* (2006.01)
(Continued)

(52) U.S. Cl.
CPC .......... *B23B 5/36* (2013.01); *B23B 7/02* (2013.01); *B23B 29/04* (2013.01); *B23C 3/00* (2013.01);
(Continued)

(58) Field of Classification Search
CPC ..... B24B 11/00; B24B 13/06; B24B 13/0037; B23Q 2230/004; B23B 5/36; B23B 7/02; B23B 29/04
See application file for complete search history.

(56) References Cited

U.S. PATENT DOCUMENTS 4,947,715 A * 8/1990 Council, Jr. .......... B24B 13/046
451/277
5,938,381 A * 8/1999 Diehl ...................... B24B 11/00
409/131
(Continued)

FOREIGN PATENT DOCUMENTS

CN 2529731 Y 1/2003
CN 2858178 Y 1/2007
(Continued)

OTHER PUBLICATIONS

German Office Action, Application No. 10 2012 004 543.3, Mailing Date Jan. 23, 2013, 6 pages.
(Continued)

*Primary Examiner* — Will Fridie, Jr.
(74) *Attorney, Agent, or Firm* — Reising Ethington, P.C.

(57) ABSTRACT

The invention relates to a machine for processing plastic workpieces. A machine housing surrounds a working chamber located between a workpiece spindle for rotationally driving the workpieces about a workpiece axis of rotation and a fast tool servo for producing an oscillating feeding movement of a rotary tool in the direction of the workpieces. The workpiece spindle is provided with a carriage which can be driven and is guided on at least two guide surfaces of a guiding arrangement in order to produce a relative advancing movement between the workpiece and the rotary tool. The advancing movement runs transversely with respect to the feeding movement and defining therewith a processing plane in which during processing the rotary tool engages (Continued)

with the workpiece. The guiding arrangement is mounted on the machine housing such that the processing plane extends between the two guide surfaces.

28 Claims, 11 Drawing Sheets

(51) Int. Cl.
  *B24B 13/04*    (2006.01)
  *B24B 41/02*    (2006.01)
  *B23C 3/00*     (2006.01)
  *B23B 7/02*     (2006.01)
  *B23B 29/04*    (2006.01)
  *B23Q 1/01*     (2006.01)

(52) U.S. Cl.
  CPC ............ *B24B 13/046* (2013.01); *B24B 41/02* (2013.01); *B23B 2215/40* (2013.01); *B23C 2215/40* (2013.01); *B23Q 1/015* (2013.01); *Y10T 82/2502* (2015.01)

(56) References Cited

U.S. PATENT DOCUMENTS

| | | | |
|---|---|---|---|
| 6,237,452 B1 | 5/2001 | Ludwick et al. | |
| 6,553,875 B1* | 4/2003 | Miyano ................... | B23B 3/162 82/117 |
| 7,036,408 B2 | 5/2006 | Savoie et al. | |
| 7,278,192 B2 | 10/2007 | Schaefer | |
| 7,440,814 B2 | 10/2008 | McPherson et al. | |
| 7,597,033 B2 | 10/2009 | Savoie et al. | |
| 8,056,453 B2 | 11/2011 | Savoie | |
| 8,166,622 B2* | 5/2012 | Meyer ..................... | B23B 29/26 29/27 C |
| 8,683,897 B2* | 4/2014 | Schneider ............... | B23Q 1/015 82/149 |
| 2006/0081097 A1* | 4/2006 | Schneider ............... | B23Q 5/027 82/158 |
| 2006/0248697 A1* | 11/2006 | Schaefer ................. | B23Q 1/015 29/27 C |
| 2007/0276534 A1* | 11/2007 | Takahashi ................ | B23Q 1/34 700/193 |
| 2014/0165349 A1* | 6/2014 | Yang ....................... | B23P 23/02 29/56.5 |
| 2014/0375146 A1* | 12/2014 | Schneider ............... | B24B 13/06 310/12.15 |

FOREIGN PATENT DOCUMENTS

| | | |
|---|---|---|
| CN | 201157993 Y | 12/2008 |
| DE | 506 849 C | 9/1930 |
| DE | 297 17 852 U1 | 1/1998 |
| DE | 196 53 233 A1 | 7/1998 |
| DE | 10 2007 016 270 A1 | 10/2008 |
| SU | 1481038 A1 | 5/1989 |

OTHER PUBLICATIONS

PCT International Search Report and Written Opinion, International Application No. PCT/EP2013/000212; Mailing Date: May 24, 2013, 10 pages.
Chinese Office Action dated Dec. 9, 2015; Application No. 201380013421.1; Applicant: Satisloh AG, 14 pages.
International Preliminary Report on Patentability, International Application No. PCT/EP2013/000212; International Filing Date—Jan. 24, 2013, 7 pages (English Translation).

* cited by examiner

MACHINE FOR PROCESSING OPTICAL WORKPIECES, IN PARTICULAR PLASTIC SPECTACLE LENSES

TECHNICAL FIELD

The present invention relates generally to a machine for processing optical workpieces. In particular, the invention relates to a machine for processing spectacle lenses of plastics material such as is widely used in so-called "RX workshops", i.e. production facilities for large-scale production of individual spectacle lenses according to prescription.

PRIOR ART

For the processing of plastics material spectacle lenses there is usually a spectacle lens blank, also termed "blank", which is injection-molded from plastics material (for example polycarbonate, CR 39, HI index, etc.) and which has a standardized finished convex outer surface with, for example, a spherical or progressive shape. The usually concave inner or prescription surfaces receive, by way of a cutting machining, a spherical, aspherical, toroidal, atoroidal, progressive or free-shape geometry (progressive surfaces) depending on the respectively desired optical effect. The typical conventional sequence for inner surface processing provides, after blocking of the spectacle lens blank by its outer surface on a block, a milling and/or turning process for producing the optically effective shape, usually followed by a fine-grinding or polishing process for achieving the requisite surface quality.

Use is also made in the prior art for the above-mentioned turning process of so-called fast-tool lathes in which a lathe tool can be subject to highly dynamic movement either with linear reciprocation (see, for example, U.S. Pat. No. 7,036,408 B2) or rotationally (cf., for example, document U.S. Pat. No. 6,237,452 B1), so that lens surfaces which are not rotationally symmetrical can be produced in a turning process. In order to also make this technology accessible to smaller RX workshops with comparatively small capital costs compact spectacle lens lathes having only a relative small need for set-up area have already been proposed in the prior art (U.S. Pat. No. 7,278.192 B2, U.S. Pat. 8,683,897 B2).

In the case of the lathe disclosed in U.S. Pat. No. 7,278,192 B2 the machine bed and the machine upper part are formed as an integral machine stand of concrete polymer with construction of all functional surfaces and spaces. In that regard, the machine bed and the machine upper part bound a central working space. With respect to the arrangement opposite the working space a fast-tool arrangement and a workpiece spindle arrangement are attached to horizontal mounting surfaces of the machine bed, the spindle arrangement being attached by way of a cross-slide arrangement extending parallel to the mounting surfaces. This machine stand does indeed have good damping characteristics, but due to the relatively large wall thicknesses of the concrete polymer has a high intrinsic weight which in this document is estimated at, for example, 1200 kilograms.

By contrast, a spectacle lens lathe is proposed in U.S. Pat. No. 8,683,897 B2 with a machine bed which is to weigh between 100 kilograms and 500 kilograms. In that case, the machine bed is constructed as a downwardly open cast bed with longitudinal and transverse ribs which run, in particular, in the direction of the movement axes for tool (there oscillation axis Z) and workpiece (there movement axis X), the machine bed having bearing surfaces on its upper side for the tool and workpiece drives. However, these types of cubic machine beds can be subjected to not insubstantial structural deformations under highly dynamic loads, for example due to bending and torsion of the machine bed. These deformations can then be transmitted to the tool and workpiece drives arranged above the cubic machine bed structure, so that there is a risk there of undesired axial displacements and vibrations, which can have the consequence of chatter marks or the like and ultimately inaccuracies in the workpieces being processed.

What is desired is a machine, which is constructed as lightly and compactly as possible, for processing optical workpieces, particularly spectacle lenses of plastic material, where the machine has a highest possible static and dynamic stiffness and in which undesired axial displacements between the axes of movement can be reliably avoided.

SUMMARY OF THE INVENTION

A machine according to one aspect of the invention for processing optical workpieces, particularly spectacle lenses of plastics material, has a machine housing enclosing a working space. The work space lies between a workpiece spindle, which is arranged at the machine housing and by ways of which the workpiece is drivable to rotate about a workpiece axis of rotation (B axis), and a fast-tool servo, which is arranged at the machine housing, for producing an oscillatory feed movement (F axis) of a lathe tool in the direction of the workpiece. A drivable carriage is provided for the workpiece spindle or the fast-tool servo, which is guided by at least two guide surfaces of a guide arrangement and by way of which a relative advance movement (X axis) between workpiece and lathe tool can be produced. The advance movement runs transversely to the feed movement (F axis) and defines therewith a processing plane (F-X plane) in which engagement between lathe tool and workpiece arises when processing takes place, and wherein the arrangement is so mounted on the machine housing that the processing plane (F-X plane) extends between the two guide surfaces.

The machine according to the invention thus has symmetries equally in multiple respects: in the first instance, the machine housing, which (also) takes over the functions of a machine bed, encloses the working space and at the same time bounds or forms this, so that a part of the machine housing is present on either side of the working plane. Next, the workpiece spindle and the fast-tool servo are respectively arranged on a side of the working space at the machine housing, thus are positioned with respect thereto quasi in mirror symmetry. Finally, there is a similar symmetry with the guide surfaces of the guide arrangement for the carriage, which are arranged on the machine housing on either side of the processing plane.

Overall, there is a structural and thermal symmetry with respect to several planes, which results not only in a very high structural stiffness of the machine, but also in substantially equal force guidance paths and thermal paths deriving from processing engagement and heat sources, for example the drives of the B, F and X axes. Any thermally-induced deformations in the carriage and/or in the machine housing in that case do not have the consequence, particularly by virtue of the arrangement in accordance with the invention of the guide surfaces with respect to the processing plane (F-X plane), of displacement of axial alignment of the workpiece (F axis) relative to the workpiece (B axis) - see, for example, U.S. Pat. No. 7,597,033 B2 with respect to processing errors (so-called "center features" or center singularities) otherwise possible in that case - even when, in particular, the fast-tool servo and the workpiece spindle heat up to different extent. The same applies to dynamic machine deformations during processing, for example as a consequence of excitation of vibration of the machine housing by the lathe tool, which oscillates at comparatively high frequencies (for example 500 Hz), at the fast-tool servo.

A once-set calibration of the cutter of the lathe tool, which can be mounted at the fast-tool servo with, for example, a mount as described in U.S. Pat. No. 8,166,622 B2, with respect to the workpiece axis of rotation (B axis) of the workpiece spindle is thus maintained even in the event of machine heating. This advantageously also makes possible the use of tool holders in the machine in which the position of the tool cutter has been preset outside the machine, presupposing a sufficiently precise interface between tool holder and fast-tool servo.

Further advantages of the machine design according to the invention are that—by comparison with the prior art outlined in the introduction—as a consequence of the high structural stiffness it is also possible to reduce the wall thicknesses of the machine housing in the sense of a lightweight construction and/or to make use of other, lighter materials for the machine housing, so that the machine is lighter overall. Thus, use can also be made—apart from, obviously, an economic grey-iron casting—of a light metal alloy, particularly an aluminum alloy, for the machine housing, which by virtue of its good thermal conductivity ensures rapid transfer of heat, whereby a stable machine operating temperature can rapidly be established. Due to the machine design in accordance with the invention the otherwise disadvantageous, comparatively high coefficient of thermal expansion of such an alloy does not have a negative influence on machine calibration.

The carriage is preferably substantially O-shaped as seen in cross-section and has a central receiving space for the workpiece spindle. Such a carriage is not only of very compact construction, but also has, in the case of a closed flow of force, a very high stiffness as well as, again, symmetrical thermal expansion behavior.

It is additionally preferable if a linear motor, which has a primary part with coils and a secondary part with magnet plates, is provided for drive of the carriage. The primary part is attached to the machine housing in long-stator mode of construction, whereas the secondary part is mounted on the carriage. In the first instance, such a linear motor is available on the market at a favorable price and without problems. Moreover, the preferred arrangement of primary part and secondary part has advantages in the sense that the heat generated by the primary part can be dissipated via the machine housing, so that cooling of the linear motor may be redundant, and that the power supply lines for the linear motor do not have be dragged by the carriage, which by comparison with a converse arrangement - equally possible in principle - not only reduces mechanical effort, but also ensures a smaller mass of the moved components and thus better acceleration behavior.

Various designs are conceivable for the guide arrangement for the carriage as long as it has at least two active guide surfaces, which as indicated above can be positioned with respect to the processing plane (F-X plane). Thus, the guide arrangement can be, for example, a rod guide with two cylindrical guide rods extending through the carriage, in which case each guide rod forms by its outer circumferential surface a guide surface co-operating with associated spherical bushes in the carriage. Equally possible would be, for example, a guide arrangement with only one comparatively wide guide rail having guide grooves which are arranged on opposite longitudinal sides and which each form at least one of the required guide surfaces, these co-operating with associated bearing elements. The guide rail, provided with an opening for passage of the workpiece spindle, could also be mounted at the carriage so that the guide surfaces are at the carriage, while the associated bearing elements are mounted at the machine housing. However, current preference is for a guide arrangement with two guide rails, which are mounted on the machine housing and which each form at least one of the guide surfaces. At least two, preferably four, guide shoes are fastened to the carriage and individually or in pairs are associated with a guide rail. These types of linear guides offer, with little need for constructional space, high levels of load-bearing capability, are simple to mount and are commercially available without problems, for example as type SGL-HYF from the company NB Nippon Bearing, Japan. Linear guides of the type M/V from the company Schneeberger, Switzerland, are a further alternative.

It is additionally preferred if one of these guide rails is arranged axially at the height of the linear motor as seen in the direction of a center axis of the machine housing, so that in advantageous manner it is capable of accepting the magnetic forces thereof without torsional moments of greater magnitude acting on the guide arrangement, and/or if the other guide rail is arranged on the side of the linear motor remote from the working space, which is conducive to a small cross-section of the machine housing perpendicularly to the center axis thereof.

In furtherance of the concept of the invention the fast-tool servo can be thermally conductively connected with the machine housing on either side of the processing plane (F-X plane) by way of fasteners and statically clamped in place. In this manner, the static fastening forces and dynamic forces during workpiece processing as well as heat are introduced, dissipated and otherwise act uniformly on both sides of the processing plane (F-X plane) so that mutual compensation of the effects thereof with respect to the processing plane is provided.

In principle, different cross-sectional shapes for the machine housing are possible without departing from the concept of the invention, for example, square, rectangular, oval, hexagonal or polygonal cross-sections. However, it is preferred, particularly with respect to good discharge of machining chips and ease of cleaning, if the working space bounded by the machine housing has a substantially circular cross-section (cylindrical boundary surface, overall barrel-shaped form) as seen in a section perpendicular to the center axis of the machine housing.

Moreover, the machine housing can include a housing section at the workpiece side and a housing section at the tool side, which housing sections are constructed integrally or as separate parts connected together directly or indirectly. Although fittings, seals, etc., which in the case of multi-part housing construction usually have to be provided at the connecting locations of the housing parts, are avoided by an integral housing construction, machining of an integral housing is relatively difficult in the internal region. To that extent, current preference is for a two-part housing construction in which two housing parts are directly connected together, which ensures simple capability of machining even in the internal region. However, a multi-part housing construction with more than two parts is also possible, for example a three-part housing construction with the housing section at the workpiece side as a first part, the housing section at the tool side as a second part and a section, which is, for example, tubular and radially outwardly bounds the working space, as a third part, into which the first and second parts are directly plugged on opposite sides in order to indirectly connect the latter.

With respect to a very high level of stiffness, a low weight and compact dimensions it is additionally preferred if the housing section at the workpiece side has similarly to a spoked wheel a tubular, substantially hollow-cylindrical inner section (hub) for receiving the fast-tool servo and a tubular, substantially hollow-cylindrical outer section (rim) surrounding the inner section, the sections being connected together by way of webs extending in spoke-like manner (spokes).

With regard to the housing section at the workpiece side, this preferably can have a tubular, substantially hollow-cylindrical outer section surrounding two substantially block-shaped wall sections, which are arranged substantially parallel to one another and to the center axis of the machine housing and extend up to an inner circumferential surface of the outer section and which bound therebetween a receiving space for the carriage and the drive thereof. This design again favors symmetrical transmission or dissipation of force and heat and moreover is of very compact construction.

In one advantageous embodiment, the substantially block-shaped wall sections respectively have an inner surface of which, for example, one is usable as support surface for the primary part of the linear motor and an outer surface, which surfaces extend substantially parallel to the center axis of the machine housing. A wall disc bounds the working space, runs substantially perpendicularly to the center axis of the machine housing, and extends peripherally up to the inner circumferential surface of the outer section to connect the inner and outer surfaces. This development is also conducive to symmetrical dissipation and transfer of force and heat.

With respect to a very stiff connection of the guide arrangement with the machine housing it is in that regard preferred if the substantially block-shaped wall sections respectively form, by the end faces thereof remote from the working space, on either side of the processing plane (F-X plane) a bearing surface for the guide arrangements so that the guide arrangement is based on large cross-sections with high moments of resistance, particularly with respect to bending.

For preference, the machine housing is provided near the fast-tool servo with a cut-out for receiving a milling spindle. Preliminary edge formation (so-called 'cribbing' in spectacle lenses), in a given case even finished edge formation of spectacle lenses to frame shape, can thus also be carried out by a milling tool, which is mounted at the milling spindle and protrudes into the working space, in one and the same machine. The milling spindle can optionally also be arranged to be longitudinally displaceable in its mount in the machine housing, as a result of which, for example, chamfers can be formed at the workpiece.

Moreover, it is also possible for the design to be such that the workpiece spindle is longitudinally displaceable (Y axis) with respect to the carriage in the direction of the workpiece axis of rotation (B axis). Consequently, further processing and/or calibration possibilities of the machine advantageously arise. On the one hand in the case of suitable angle setting of the mentioned milling spindle with respect to the processing plane (F-X plane) processing, by milling, of the end surface of the workpiece mounted on the workpiece spindle can also be carried out as described in U.S. Pat. No. 5,938,381 A, which is hereby incorporated by reference. With regard to the expanded calibration possibilities, ultimately in the case of suitable angle setting of the workpiece axis of rotation (B axis) with respect to the processing plane (F-X plane) as described in U.S. Pat. No. 7,597,033 B2 which is hereby incorporated by reference (there angle $\alpha$ of incidence) a highly accurate automatic alignment of the working point of the cutting edge of the lathe tool to the workpiece axis of rotation (B axis) of the workpiece spindle can take place, as also explained in detail in document U.S. Pat. No. 7,440,814 B2; which is hereby incorporated by reference with respect to this calibration.

BRIEF DESCRIPTION OF THE DRAWINGS

The invention is explained in more detail in the following by way of preferred embodiments with reference to the accompanying, partly simplified or schematic, drawings, in which.

Figure 1:
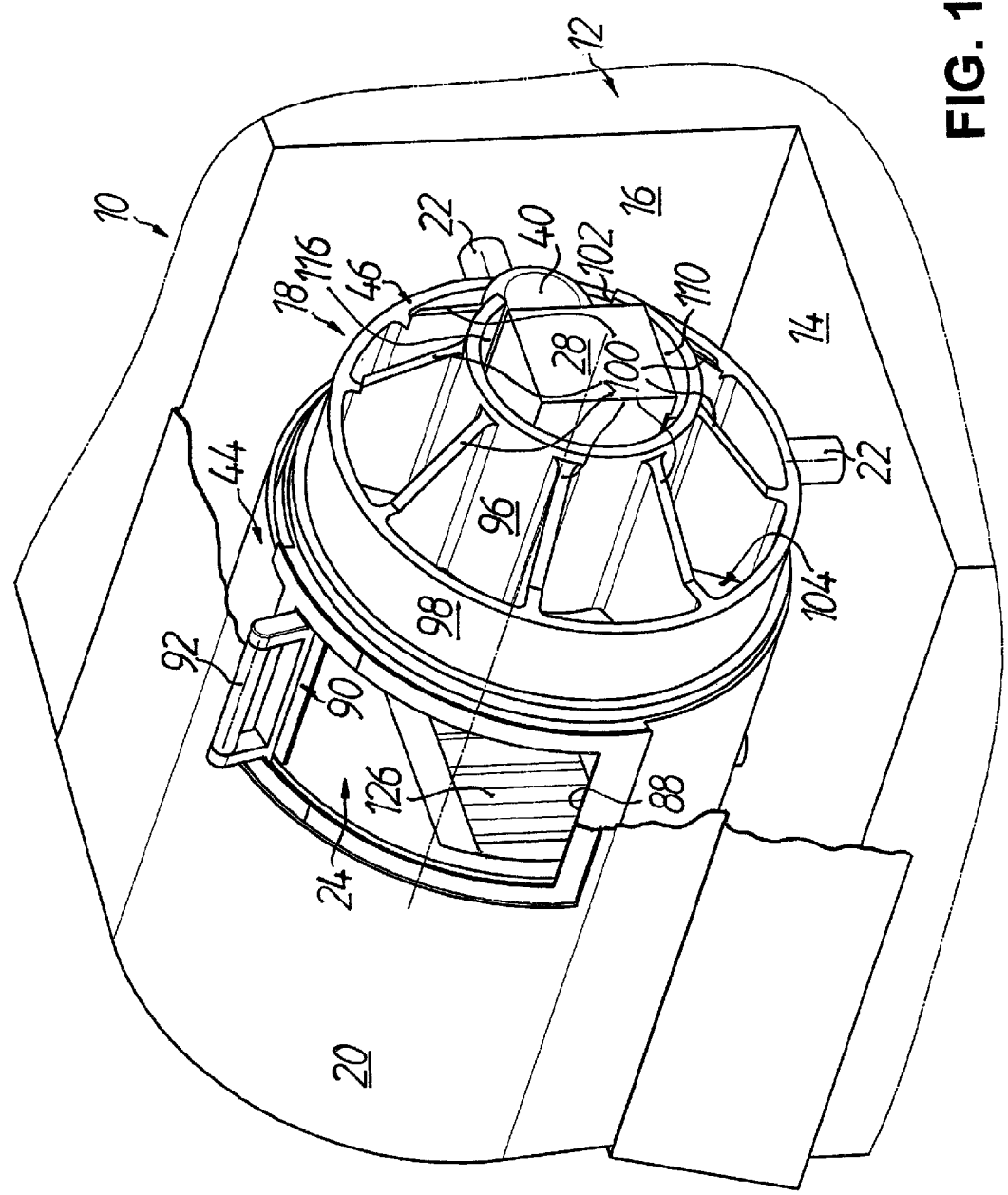
FIG. 1 shows a broken-away and partly broken open perspective view of a machine for processing optical workpieces, specifically plastics material spectacle lenses, according to a first embodiment of the invention obliquely from above and front right, with opened pivot door for access to the working space.

In the drawings, for simplification of the illustration apart from parts of the casing particularly also the control unit and control, panes, deposits for workpieces and tools, the supply devices (including lines, hoses and pipes) for current, compressed air and coolant, the coolant return as well as measuring, maintenance and safety devices have been largely omitted, since they are not necessary for an understanding of the invention.

DETAILED DESCRIPTION OF THE EMBODIMENTS

A CNC-controlled machine, particularly for end-face surface-processing of spectacle lenses L of plastics material, is denoted by 10 in FIGS. 1 to 8. The machine 10 comprises a machine frame 12, which is illustrated only schematically and in broken-away form in FIGS. 1, 3 to 6 and 8 and which can be constructed as a welded construction of metal sheets, with a horizontally extending upper side 14 and a vertically extending rear wall 16, which downwardly and rearwardly bound a receiving space, which is substantially L-shaped as seen in cross-section, for a machine housing 18 described in more detail in the following. To the front, top and sides the receiving space for the machine housing 18 is bounded by a partly transparent casing 20 which is removable from the machine frame 12 and which is similarly illustrated only schematically and in broken-away form in FIG. 1. A machine control, a control unit, supply devices for current, compressed air and coolant as well as a device for coolant return, which are not shown in the figures, in particular, are arranged in or at the machine frame 12. As can already be seen from FIG. 1 and as described in more detail in the following the substantially barrel-shaped machine housing 18 is resiliently mounted on the machine frame 12 by way of a plurality of vibration-absorbing elements, here rubber-metal buffer elements 22.

The machine housing 18, which encloses or surrounds a working space 24, in general receives the following components and subassemblies, as can be seen in, in particular, FIGS. 1, 2, 5 and 6: on a first side of the working space 24, (i) a workpiece spindle 26, by which the spectacle lens L is drivable to rotate about a workpiece axis B of rotation, and on a second side, which is opposite the first side, of the working space 24 (ii) a fast-tool servo 28 for producing an oscillatory feed movement of a rotary or lathe tool 30 or an engraving tool 30' (see FIG. 6) along a here linearly extending F axis in the direction of the spectacle lens L. In addition, in the illustrated embodiment the workpiece spindle 26 is mounted in (iii) a drivable carriage 32, by which an advance movement along a linearly extending X axis can be produced between the spectacle lens L and the lathe tool 30, the advance movement running transversely to the feed movement (F axis). For that purpose the carriage 32 is guided by at least two mounted on the machine housing 18, which are only schematically indicated in FIGS. 2 and 4 to 6, because there is a difference from guide type to guide type (cf. the examples with respect thereto mentioned in the introduction) guide surfaces 34, 36 of a guide arrangement 38. In addition, in the case of the illustrated embodiment there is arranged on the second side of the working space 24, apart from the fast-tool servo 28, additionally (iv) a milling spindle 40 which, protruding into the working space 24, carries and drives a milling tool 42 to rotate about a tool axis C of rotation, while the spectacle lens L is suitably rotated or moved in the B and X axes, particularly for preliminary edging of the edge of the spectacle lens L in a manner known per se (so-called "cribbing").

Figure 4:
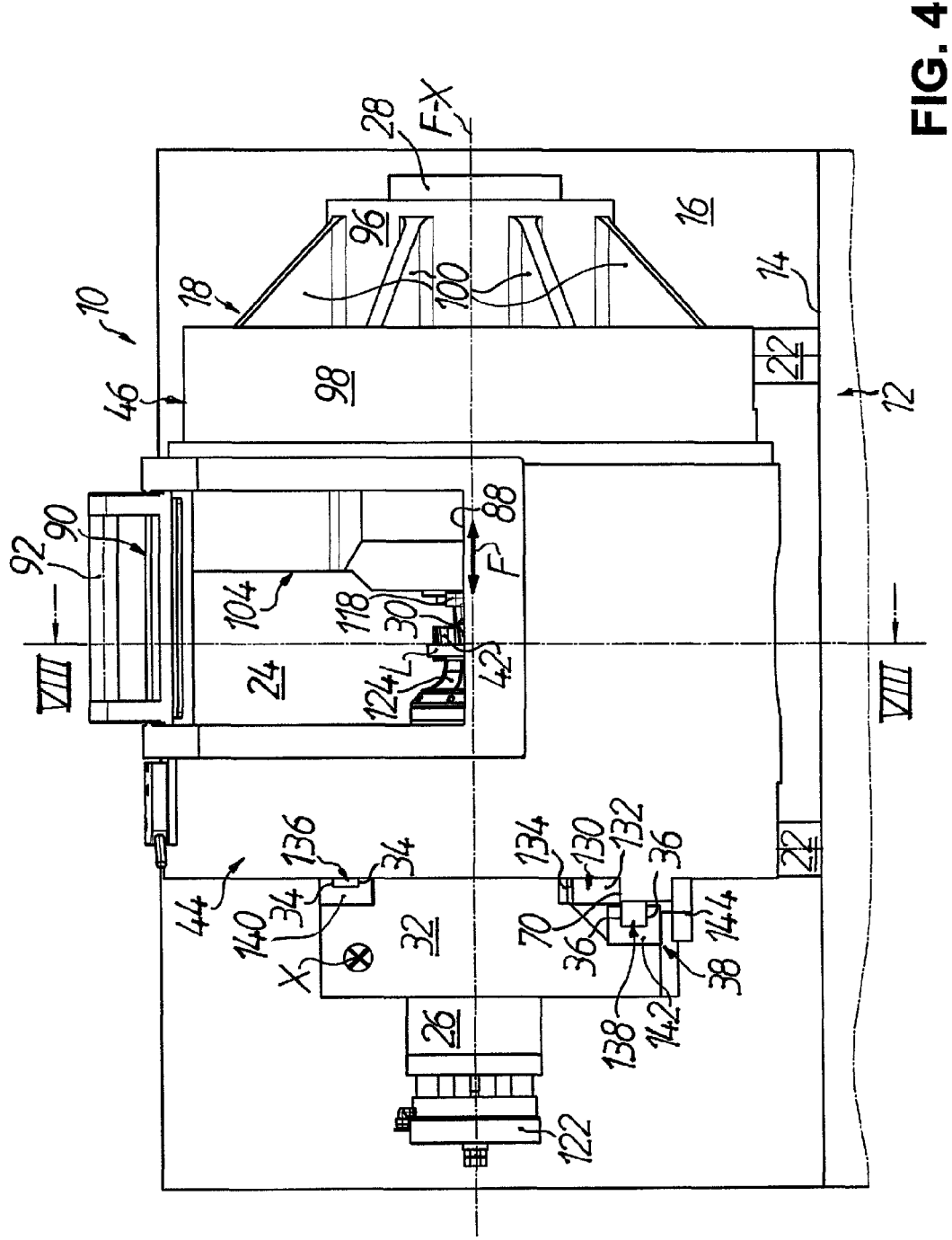
FIG. 4 shows a broken-away front view of the machine according to FIG. 1, with the simplifications of FIG. 3, but by comparison therewith opened pivot door.
Figure 5:
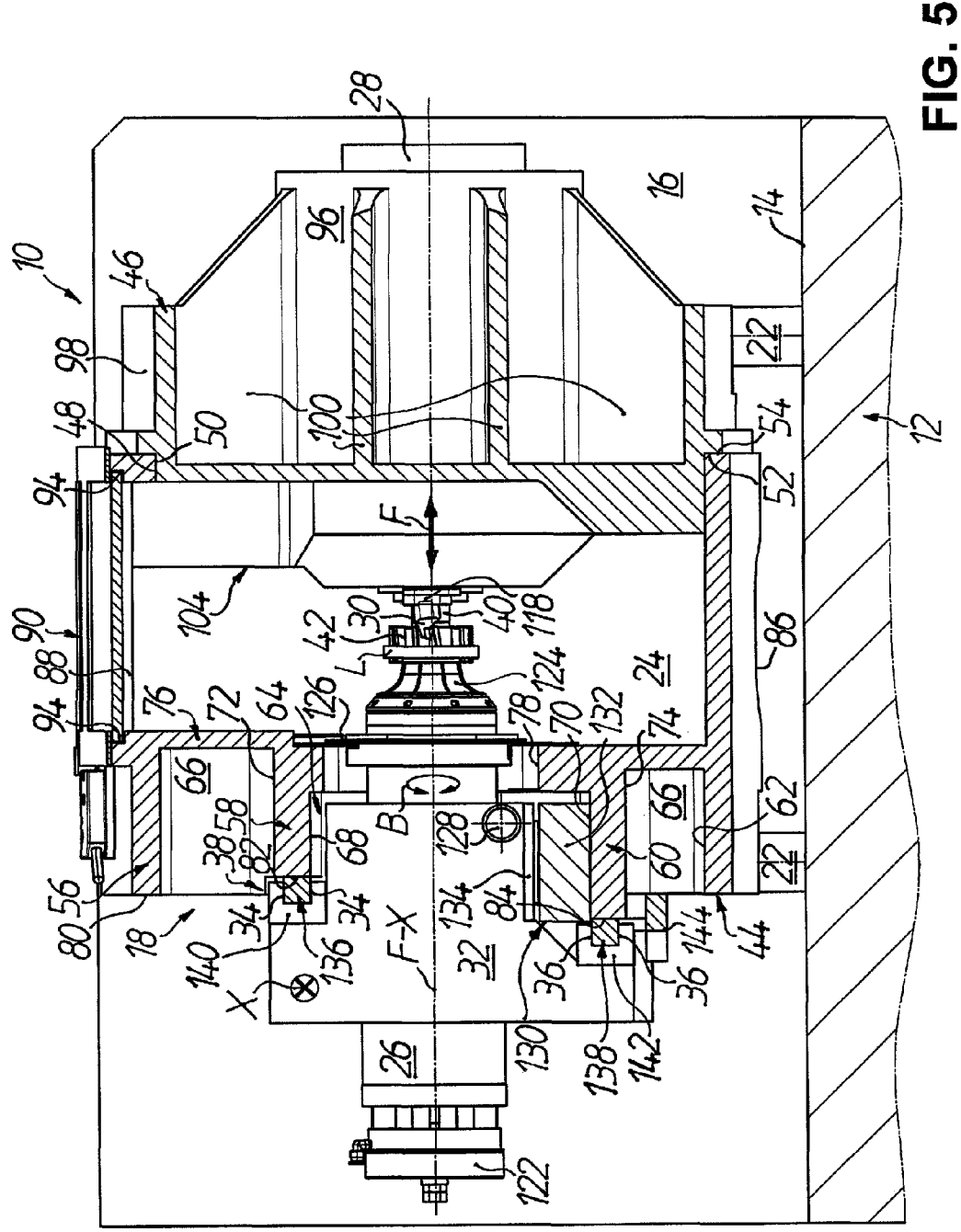
FIG. 5 shows a broken-away side view of the machine according to FIG. 1 in correspondence with the section line V-V in FIG. 3.
Figure 8:
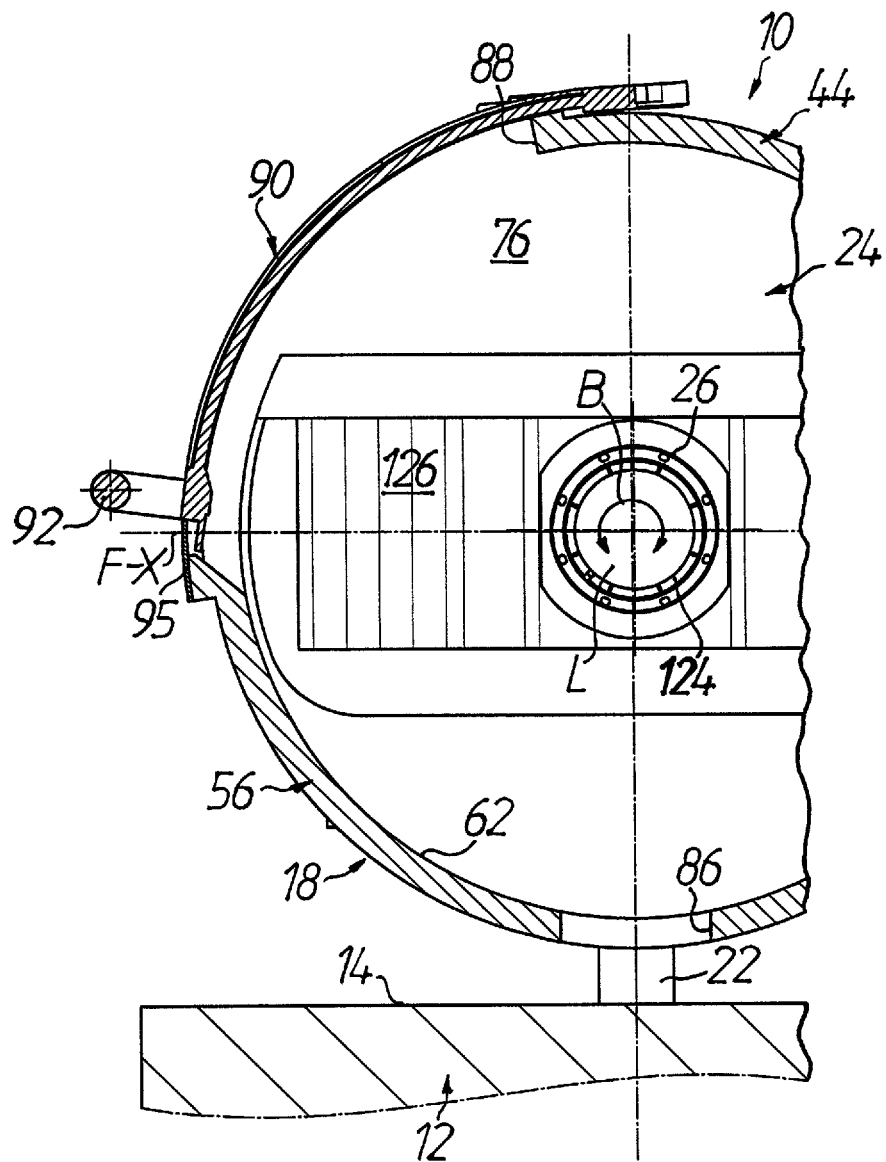
FIG. 8 shows a broken-away side view of the machine according to FIG. 1 in correspondence with the section line VIII-VIII in FIG. 4, but with closed pivot door.

To that extent the feed movement (F axis) at the fast-tool servo 28 and the advance movement (X axis), which is produced by way of the carriage 32 at the workpiece spindle 26, define a processing plane F-X, which is indicated in FIGS. 4, 5 and 8 by dot-dashed lines. In the case of front-surface machining of the spectacle lens L, a substantially punctiform, machining engagement between the lathe tool 30 and the spectacle lens L takes place. At the same time the workpiece spindle 26 rotates the spectacle lens L about the workpiece axis B of rotation with generation of a cutting force, so that the desired surface shape is created at the spectacle lens L. As will be described in more detail in the following it is important that the guide arrangement 38 is mounted on the machine housing 18 in such a manner that this processing plane F-X runs between the mentioned guide surfaces 34, 36 so that at least one load-bearing guide surface 34 is disposed on one side, for example above the processing plane F-X, (while at least one further load-bearing guide surface 36 is disposed on another side, for example below the processing plane F-X.

Figure 9:
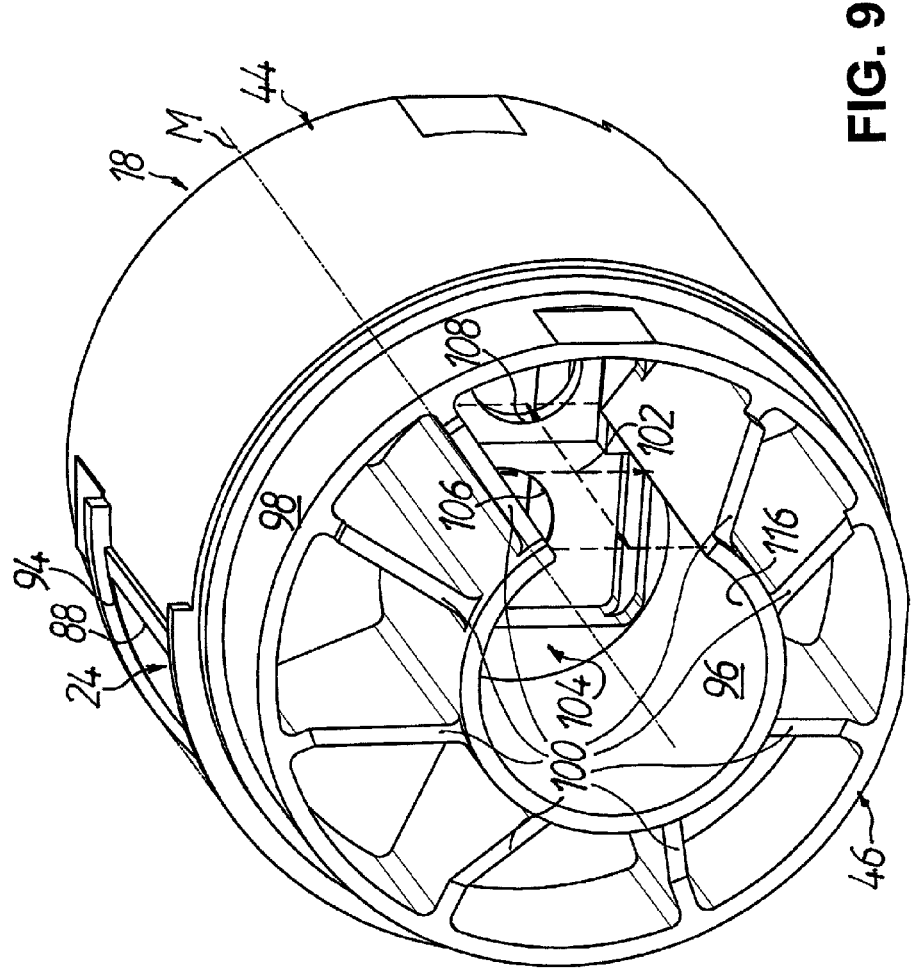
FIG. 9 shows a perspective view of a machine housing of the machine according to FIG. 1 obliquely from above and back right (tool side)
Figure 10:
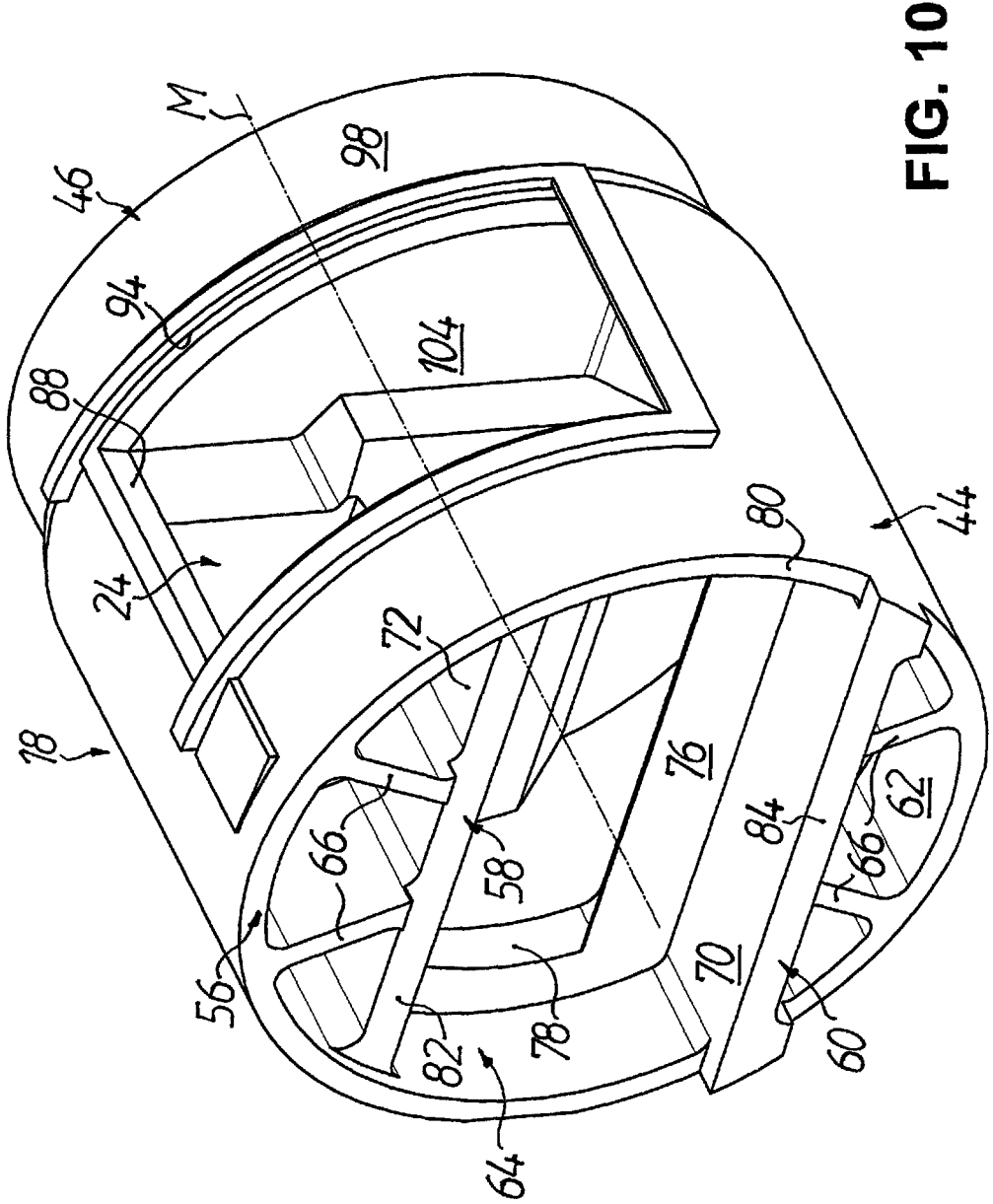
FIG. 10 shows a perspective view of the machine housing, which is already shown in FIG. 9, of the machine according to FIG. 1 obliquely from above and front left (workpiece side)

Before the above-mentioned components and sub-assemblies, which determine the kinematics and processing possibilities of the machine 10, as well as the arrangement thereof and fastening in the machine housing 18 are explained in more detail the last-mentioned shall be described in more detail particularly with reference to FIGS. 9 and 10.

The machine housing 18, which in the illustrated embodiment is made of a light-metal alloy, preferably an aluminum alloy, and which is substantially rotationally symmetrical, has two parts, namely a housing section 44 at the workpiece side and a housing section 46 at the tool side, which sections are directly connected together. For that purpose, the housing section 46 at the tool side has, according to FIGS. 5 and 6, on its side facing the working space 24 and at the outer circumference an encircling flange surface 48, onto which the housing section 44 at the workpiece side is pushed, with mechanically positive centering, by an encircling connecting surface 50 provided at the inner circumference. The axial relative position of the housing sections 44, 46 is in that case determined by an annular abutment surface 52 at the housing section 46 at the tool side, against which the housing section 44 at the workpiece side bears by an annular end face 54. In this connecting region the housing sections 44, 46 are screw-connected together, which for reasons of drawing simplification is not shown.

The housing section 44, which is at the workpiece side, of the machine housing 18 has a tubular, substantially hollow-cylindrical outer section 56, at which the connecting surface 50 is formed. The outer section 56 surrounds two substantially block-shaped wall sections 58, 60 which are arranged parallel to one another and to the center axis M of the machine housing 18. According to FIG. 10 the wall sections extend up to an inner circumferential surface 62 of the outer section 56 and bound therebetween a receiving space 64 for the carriage 32. Each block-shaped wall section 58, 60 is supported, on a side remote from the receiving space 64, relative to the outer section 56 with the help of two ribs 66. In that case the ribs 66 extend substantially over the entire width of the block-shaped wall sections 58, 60 as well as from this up to the inner circumferential surface 62 of the outer section 56 and in that case run substantially in radial direction as referred to the center axis M of the machine housing 18.

As can be seen particularly in FIGS. 5 and 10, the block-shaped wall sections 58, 60 each have an inner surface 68, 70 and an outer surface 72, 74, which run substantially parallel to the center axis M of the machine housing 18 and in the direction of the working space 24 are connected with a wall disc 76 bounding the working space 24. The wall disc 76 runs substantially perpendicularly to the center axis M of the machine housing 18 and extends peripherally up to the inner circumferential surface 62 of the outer section 56. Between the block-shaped wall sections 58, 60 the wall disc 76 according to FIG. 5 has a thicker wall thickness and is there provided with an elongate cut-out 78, which is substantially rectangular as seen in plan view, for passage of the workpiece spindle 26.

As FIGS. 5 and 10 best show, as seen going from the working space 24 in the direction of the center axis M of the machine housing 18 the upper block-shaped wall section 58 is axially recessed somewhat relative to an end face 80 at the outer section 56 of the housing section 44 at the workpiece side, whereas the lower block-shaped wall section 60 axially protrudes somewhat relative to the end face 80. At its end faces remote from the working space 24 the block-shaped wall sections 58, 60 each form on either side of the processing plane F-X a respective bearing surface 82 or 84 for the guide arrangement 38. As a consequence of the above discussed different lengths of the block-shaped wall sections 58, 60 in the direction of the center axis M of the machine housing 18, the bearing surface 82 at the upper block-shaped wall section 58 is disposed axially above the inner surface 70 of the lower block-shaped wall section 60.

According to, in particular, FIG. 8 the working space 24 bounded by the machine housing 18, more precisely the inner circumferential surface 62 of the outer section 56 of the housing section 44 at the workpiece side, has a substantially circular cross-section as seen in a section perpendicular to the center axis M of the machine housing 18. The outer section 56 of the machine housing 18 is provided in a base region of the working space 24 with a substantially oval (see also FIG. 6) drain opening 86 for coolant and waste material removal, through which waste material and coolant can run off into a coolant container (not shown) arranged below the machine housing 18 in the machine frame 12.

In forward direction, i.e. towards an operator position, the working space 24 is provided over about a quarter of the cylindrical circumference of the outer section 56 with an access opening 88, which is rectangular as seen in a development and which can be selectably covered by a manually actuable pivot door 90. The preferably at least partly transparent pivot door 90, which is provided with a handle 92, is in that case curved just like the machine housing 18 and is guided in guide tracks 94, which are formed at the outer circumference of the outer section 56 on both sides of the access opening 88 and which are closed by strip-shaped sheet-metal covers 95 screw-connected with the machine housing 18.

Figure 3:
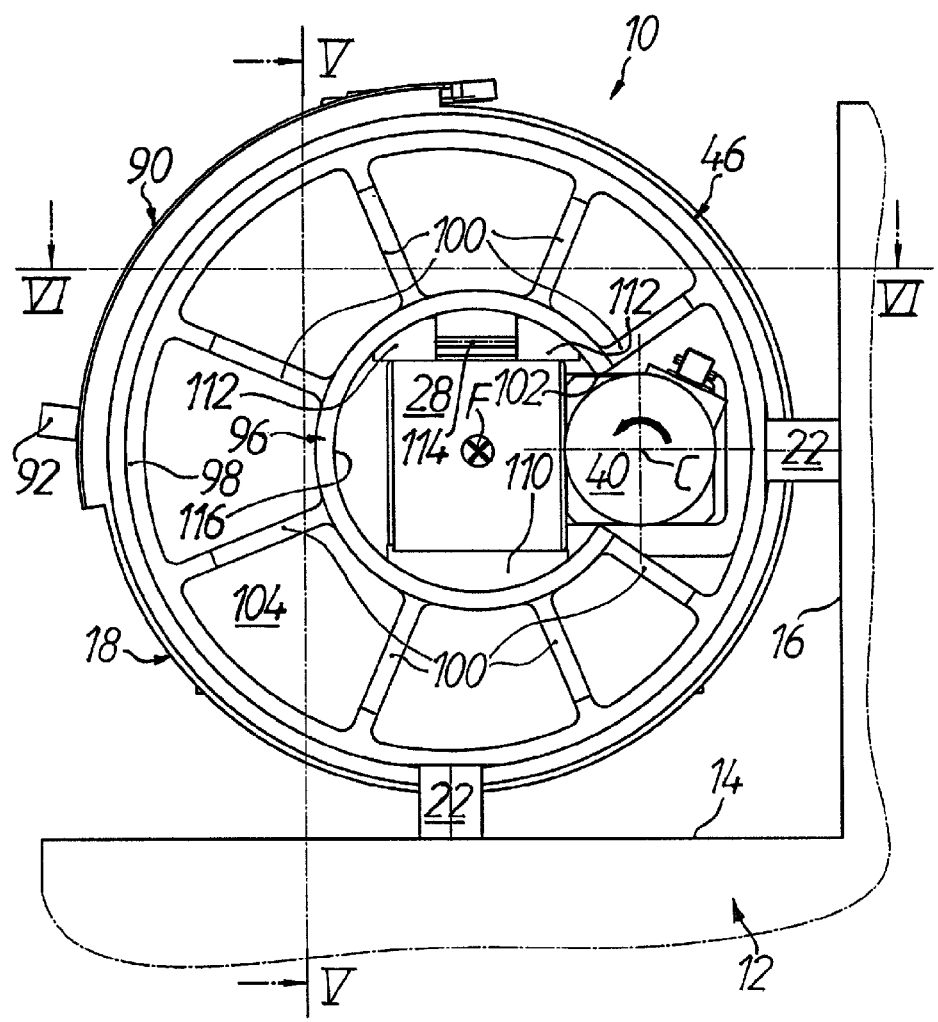
FIG. 3 shows a broken-away side view of the machine according to FIG. 1 from the right in FIG. 1, without casing parts, but with machine frame as well as closed pivot door.

Further details of the housing section 46, which is at the tool side, of the machine housing 18 are shown clearly in FIGS. 1, 3 to 6 and 9. Accordingly, the housing section 46 at the tool side has a tubular, substantially hollow-cylindrical inner section 96 for reception of the fast-tool servo 28 and a tubular, substantially hollow-cylindrical outer section 98 surrounding the inner section 96, the sections being connected together by way of webs 100 extending in spoke-like manner. As can be seen in FIG. 3, the inner section 96 in that case is arranged to be somewhat eccentrically offset with respect to the outer section 98 and thus to the center axis M of the machine housing 18. The webs 100 in the illustrated embodiment eight in number extend with respect to a web number of nine in distribution with substantially uniform angular spacing over the circumference approximately radially to the direction of movement of the lathe tool 30, i.e. with respect to the F axis of the fast-tool servo 28. Towards a side at the right in FIGS. 3 and 9 the inner section 96 is provided with a cut-out 102 in order to create a space for receiving the milling spindle 40 near the fast-tool servo 28. In this space the "ninth" web as considered in the circumferential distribution of the webs 100 is absent.

As seen going out from the working space 24 along the center axis M of the machine housing 18 the inner section 96 is formed to be longer than the outer section 98. The webs 100 are in that case so shaped and chamfered that they extend substantially over the entire length not only of the inner section 96, but also of the outer section 98. As seen towards the working space 24 along the center axis M of the machine housing 18 the webs 100 end at a multiply stepped terminating wall region 104 of the housing section 46 at the tool side. The terminating wall region 104 is, according to FIG. 9, provided with a passage opening 106 for the tools mounted on the fast-tool servo 28 and adjacent thereto with a further passage opening 108 for the milling spindle 40, but otherwise the structure formed from the inner section 96, outer section 98 and webs 100 is closed towards the working space 24.

The components and subassemblies, in particular those already mentioned in the introduction, are now mounted as follows at or in the machine housing 18 so far described The milling spindle 40 is received in the cut-out 102 of the machine housing 18 and flange-mounted in a manner, which is not shown in more detail, on the terminating wall region 104 of the housing section 46 at the tool side. It passes with suitable sealing through the passage opening 108 in the terminating wall region 104 (see FIG. 9) so that it projects into the working space 24, as can be seen particularly in FIG. 6. The milling tool 42 is drivably mounted on the milling spindle 40 and regulated in rotational speed, to rotate about the tool axis C of rotation, which in the illustrated embodiment lies in a plane together with the F axis of the fast-tool servo 28 and the X axis of the workpiece spindle 26.

The fast-tool servo 28 received in the inner section 96 of the housing section 46 at the tool side is thermally conductively connected with the machine housing 18 on both sides of the processing plane F-X by way of fasteners and statically fixed. More precisely, the fast-tool servo 28 according to FIG. 3 is mounted at the bottom on a metallic base plate 110, which in turn is secured to the inner section 96 of the machine housing 18. Two metallic cylinder-segment blocks 112 are arranged on the fast-tool servo 28, which is substantially square as seen in cross-section, which blocks can be urged apart to both sides by an interposed straining screw 114 and thus pressed against an inner circumferential surface 116 of the inner section 96. It is apparent that the cylinder-segment blocks 112 in that case at the same time press the fast-tool servo 28 downwardly against the base plate 110. As a result, the fast-tool servo 28 is not only clamped very rigidly in the machine housing 18, but also fastened in such a manner that the heat generated in/by the fast-tool servo 28 is readily dissipated by way of the base plate 110 and the cylinder-segment blocks 112 to both sides of the processing plane F-X in the machine housing 18. In an alternative (not shown), the fast-tool servo can also have a substantially cylindrical housing, which, optionally with lubrication by a thermally conductive grease, is mechanically positively fitted in the inner section of the machine housing and suitably fixed there.

Figure 6:
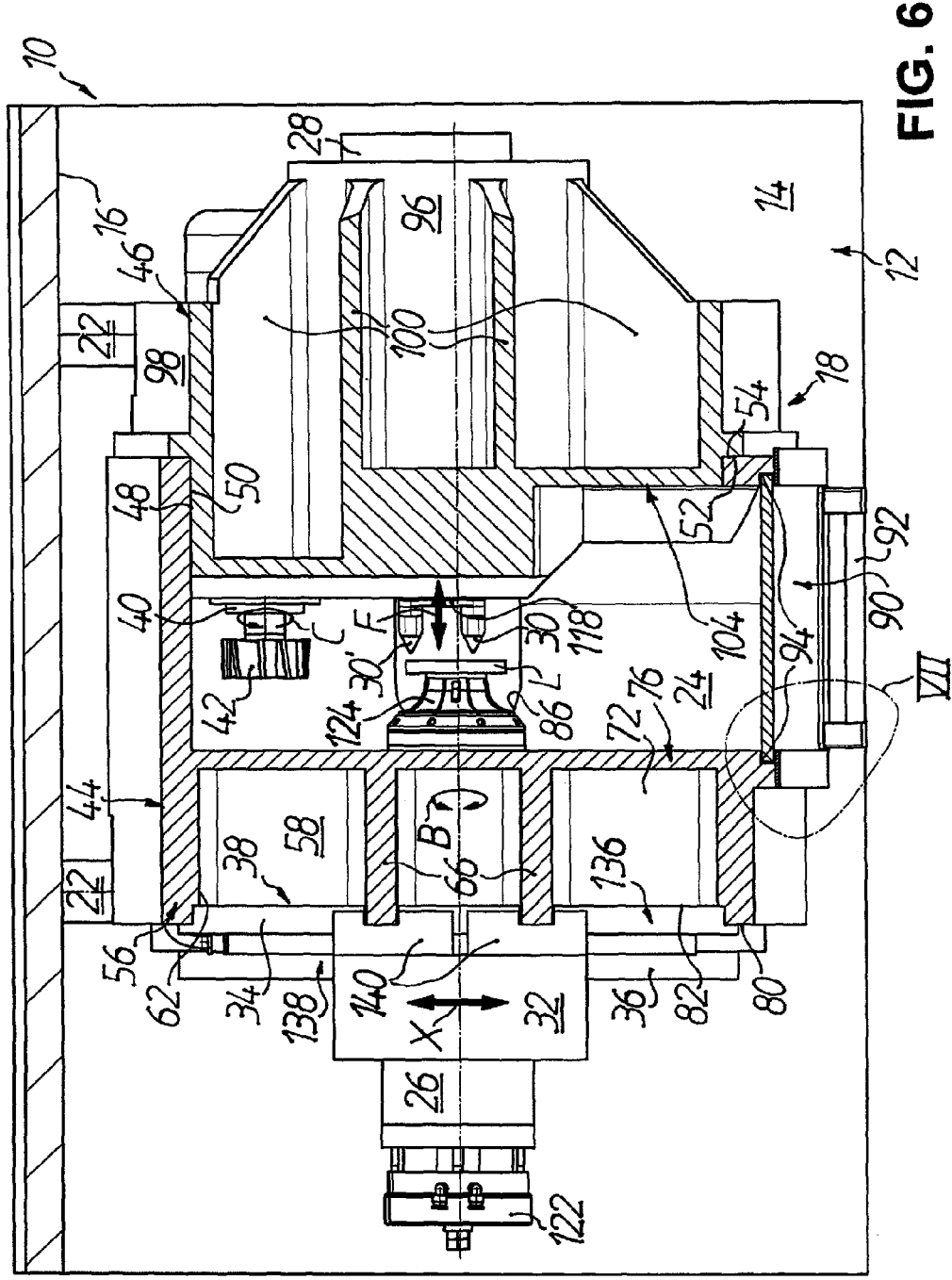
FIG. 6 shows a sectional view of the machine according to FIG. 1 in correspondence with a section line VI-VI in FIG. 3.
Figure 7:
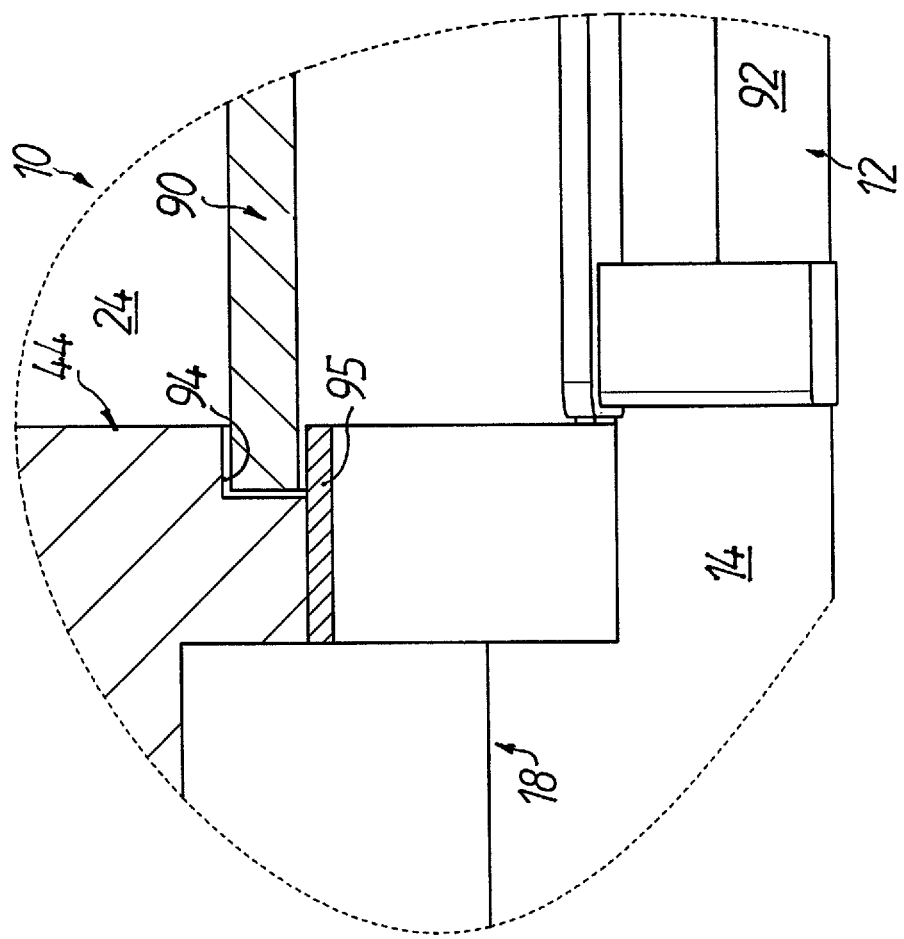
FIG. 7 shows an enlarged illustration of the detail VII, which relates to the pivot door, in FIG. 6.

As seen in axial direction, the fast-tool servo 28 bears against the terminating wall region 104 of the machine housing 18, wherein at least the tool or tools mounted at the fast-tool servo 28 passes or pass with suitable sealing through the passage opening 106 provided in the terminating wall region 104 (cf. FIG. 9) and protrude into the working space 24, as can be seen in, for example, FIG. 6. In that case, the tools 30, 30' are mounted on the fast-tool servo 28 by way of, for example, a mount 118, as is known from U.S. Pat. No. 8,166,622 B2 which is hereby incorporated by reference, for the avoidance of repetition construction and functioning of the mount. This mount 118 can advantageously also be pre-adjusted outside the machine 10.

The internal construction and the functioning of the fast-tool servo 28 shown here are otherwise described in detail in U.S. Pat. No. 8,056,453 B2 which is hereby incorporated by reference for the avoidance of express repetition. The tools 30, 30' are positionally controlled, in particular can be movable under oscillation along the F axis, by the fast-tool servo 28.

Figure 2:
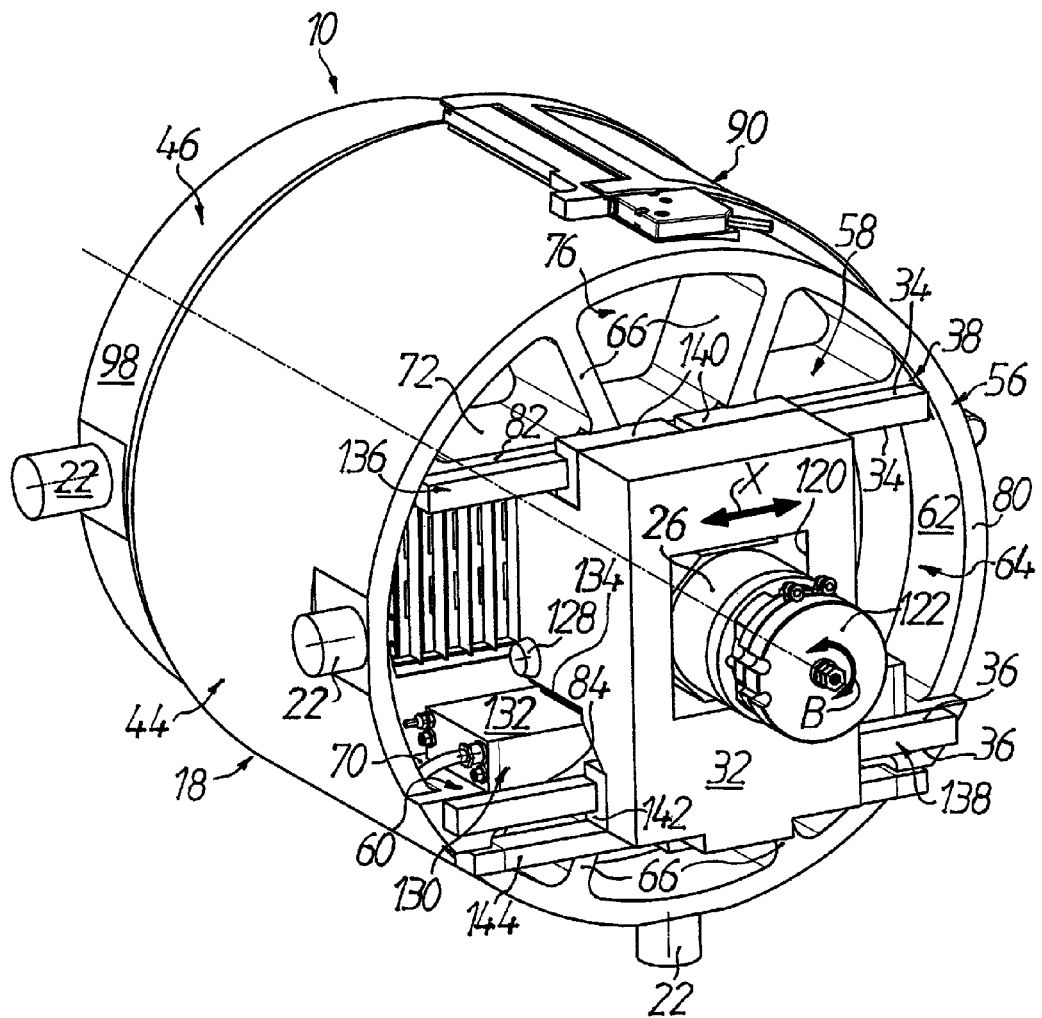
FIG. 2 shows a perspective view, which is enlarged in scale by comparison with FIG. 1, of the machine according to FIG. 1 obliquely from above and back right, with closed pivot door, wherein by comparison with FIG. 1 in addition a machine frame and casing parts were omitted so as to allow a view into the interior of the machine.

The carriage 32 according to FIG. 2 has a substantially O-shaped cross-section, with a central receiving space 120 for the workpiece spindle 26. The workpiece spindle 26 extends through the receiving space 120 and is fastened in this in suitable manner (not shown) or alternatively directly integrated together with the carriage as spindle housing (similarly not illustrated). At the end remote from the working space 24 the workpiece spindle 26 in the illustrated embodiment carries a pneumatic relief cylinder 122 for a spring-biased collet chuck 124, which is known per se and which serves the purpose of clamping the spectacle lens L, which is blocked on a block member, in the working space 24 to the workpiece spindle 26 for rotational entrainment. The workpiece spindle 26 extends by its collet chuck end into the working space 24, in which case it passes through the cut-out 78 in the wall disc 76 of the machine housing 18 (see FIG. 10). The open cross-section between workpiece spindle 26 and cut-out 78 is in that case variably bridged over with the assistance of a stainless-steel slat cover 126 with a rear-side bellows and sealed towards the working space 24. By way of the workpiece spindle 26, the spectacle lens L mounted thereon is drivable, with control in angular position, to rotate about the workpiece axis B of rotation. The rotational measuring system required for that purpose is not shown in more detail.

The carriage 32, which in the direction of the X axis carries a rubber-elastic abutment buffer 128 on both sides, is drivable by a linear motor 130. The linear motor 130 has a primary part 132 with coils and a secondary part 134 with magnet plates. Whereas the primary part 132 is fastened in long-stator mode of construction to the machine housing 18, more precisely on the inner surface 70 of the block-shaped wall section 60 of the machine housing 18, in which case the primary part 132 extends in the direction of the X axis approximately over the entire width of the inner surface 70 acting also a cooling surface, the secondary part 134 in the figures is mounted from below on the carriage 32 above the primary part 132.

The guide arrangement 38 for the carriage 32 can be best seen in FIGS. 2, 5 and 6. In the illustrated embodiment (guide from the company NB, as mentioned in the introduction) it comprises two guide rails 136, 138 and in total four guide shoes 140, 142, which are associated in pairs with the guide rails 136, 138. The guide rails 136, 138 are fastened to the machine housing 18 in parallel arrangement and, in particular, on the bearing surfaces 82, 84 of the block-shaped wall sections 58, 60, wherein the guide rails 136, 138 extend in the direction of the X axis approximately over the entire width of the bearing surfaces 82, 84. Thereagainst, the guide shoes 140, 142, which are in engagement with the guide rails 136, 138, are in the figures mounted at the bottom and top in pairs adjacent to one another on the carriage 32. It is thus ensured that the carriage 32 is guided on both sides, i.e. here both above and below the processing plane F-X, on the guide surfaces 34, 36.

According to, in particular, FIG. 5 the upper guide rail 136 with the guide surfaces 34 is arranged above, i.e. axially at the height of, the linear motor 130 as seen in the direction of the center axis M of the machine housing 18, so that with respect to the linear motor 130 there is no lever arm by way of which the linear motor 130 could exert, by its magnetic forces, rotational or torsional moments on this guide rail 136. Moreover, according to FIG. 5 the lower guide rail 138 with the guide surfaces 36 is arranged in space-saving manner on the side of the linear motor 130 remote from the working space 24. This is all made possible by the aforedescribed design of the comparatively thick, block-shaped wall sections 58, 60 of the machine housing 18, which moreover have almost the same clear spacing from the center axis M of the machine housing 18.

It remains to be noted to the carriage 32, the guidance and drive thereof, that the workpiece spindle 26 is movable with positional control along the X axis by these subassemblies. The linear travel measuring system required for this purpose is denoted in FIGS. 2, 4 and 5 by 144.

As, finally, can be inferred from FIGS. 3 to 6, the rubber-metal buffer elements 22 are so arranged that the rearward two rubber-metal buffer elements 22, which are mounted on the rear wall 16 of the machine frame 12, lie in the processing plane F-X, whereas the lower two rubber-metal buffer elements 22 mounted on the upper side 14 of the machine frame 12 are disposed, as seen in the direction of the X axis, at the axial height of the fast-tool servo 28. As seen in the direction of the F axis the rubber-metal buffer elements 22 are axially mounted at the height of the fast-tool servo 28 or of the linear motor 130. Overall, the aforedescribed machine 10 has, with respect to constructional space requirement, weight, thermosymmetry, force/heat flow, dynamic stiffness, vibration damping, thermal stability (operation without a cooling unit is optionally possible) and working space encapsulation, a substantially improved construction relative to previously known concepts for smaller machines in the spectacle lens industry.

The edge processing, by milling, of the spectacle lens L mounted on the workpiece spindle 26 by the milling tool 42 with the assistance of the positionally controlled B axis (in angle), and the positionally controlled X axis and the C axis of the machine 10, which is regulated in rotational speed does not require any further explanation at this point, since it is familiar to the person ordinarily skilled in the art. The same applies to the lathe processing of the optically active surface of the spectacle lens L by the lathe tool 30, which takes place with the assistance of the positionally controlled B (in angle), F and X axes of the machine 10.

Figure 11:
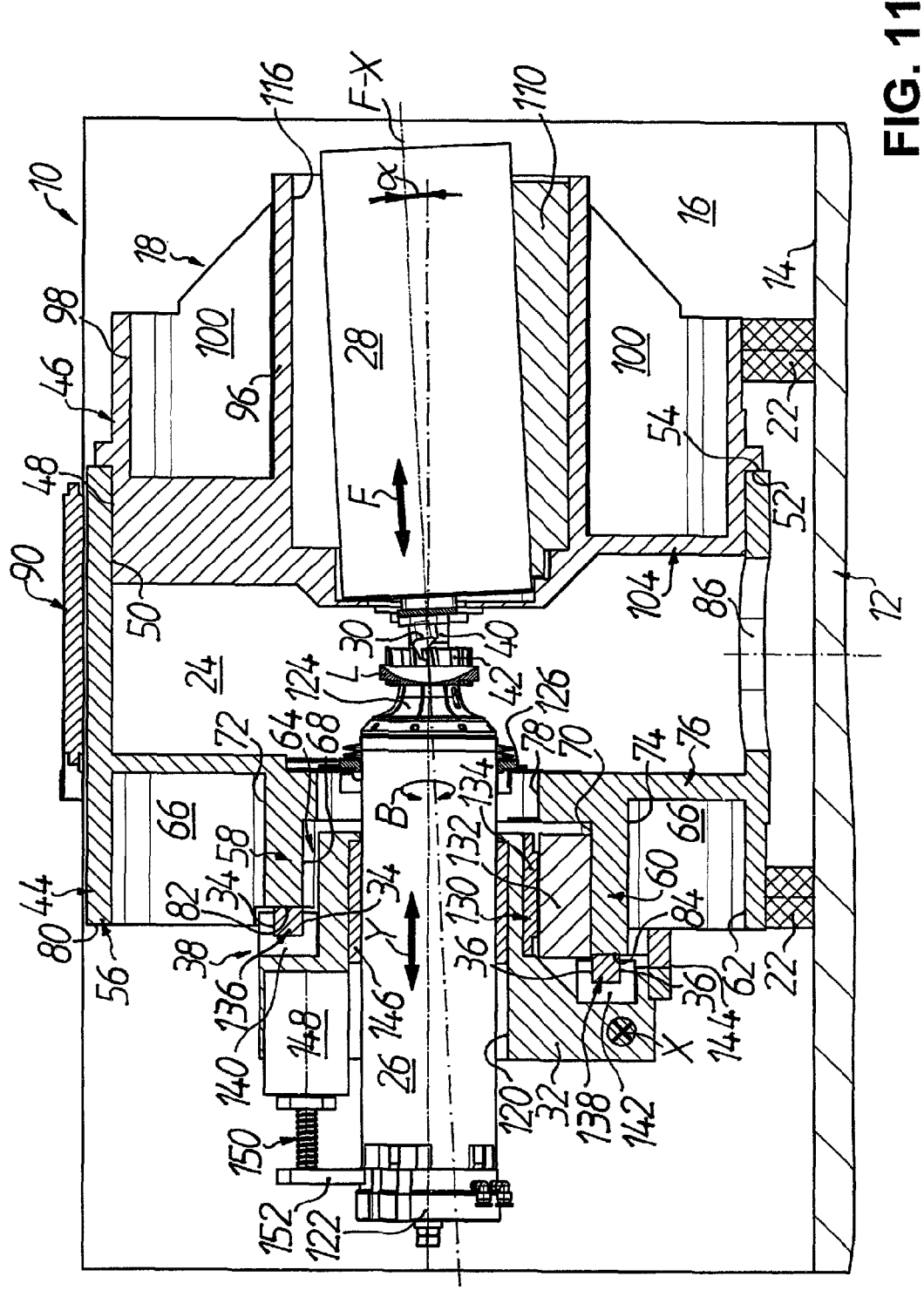
FIG. 11 shows a broken-away longitudinal sectional view of a machine for processing optical workpieces, specifically plastics material spectacle lenses, according to a second embodiment of the invention.

Finally, the second embodiment shall be described, with reference to FIG. 11, only to the extent that it significantly differs from the first embodiment explained in detail above with reference to FIGS. 1 to 10, wherein the same or corresponding components or subassemblies are provided with the same reference numerals.

As already mentioned in the introduction, the second embodiment is constructed to be expanded relative to the first embodiment with respect to further processing and calibration possibilities, namely in particular in the respect that the workpiece spindle 26 is longitudinally displaceable relative to the carriage 32 in the direction of the workpiece axis B of rotation (additional Y axis).

For that purpose the workpiece spindle 26 is initially mounted by a bearing bush 146, which can be, for example, an aerostatic bearing, a spherical bush or a slide bearing, in the receiving space 120 of the carriage 32 to be longitudinally displaceable. In addition, fastened at or in the carriage 32 is a rotary drive 148, for example a hollow-shaft servomotor, which is operatively connected by way of a threaded drive 150 (threaded spindle, threaded drive nut) with a holder 152, which in turn is mounted on the workpiece spindle 26. Through rotation of the threaded spindle by way of the rotary drive 148 it is thus possible to displace the workpiece spindle 26 relative to the carriage 32 in order to move it further into or out of the working space 24, for example in order to carry out milling processing also at the end face of the spectacle lens L (for which purpose obviously also the milling tool would have to be suitably adjusted). As an alternative, use could also be made here of a linear motor (not shown) for producing this linear movement. This movement also takes place with CNC positional control along the Y axis. The linear travel measuring system required for that purpose is not, however, shown in FIG. 11.

Moreover, in the case of the second embodiment the base plate 110 is of wedge-shaped construction as seen from the side or in section, so that the F axis in correspondence with the wedge angle is positioned obliquely at a work angle α with respect to the workpiece axis B of rotation, whereby a corresponding angular position between the processing plane F-X and a movement plane, which is defined by the axes X and Y, of the workpiece spindle 26 results. The sense and purpose of this inclined setting namely calibration of the cutting height of the lathe tool 30 with respect to the workpiece axis B of rotation under suitable drive of the F and Y axes are described in detail in to U.S. Pat. No. 7,597,033 B2 which is hereby incorporated by reference for avoidance of express repetition.

A machine for processing of, in particular, spectacle lenses of plastics material has a machine housing enclosing a working space, which lies between a workpiece spindle for rotational driving of the spectacle lens about a workpiece axis of rotation (B axis) and a fast-tool servo for generating an oscillatory feed movement (F axis) of a lathe tool in the direction of the spectacle lens. Provided for the workpiece spindle is a drivable carriage, which is guided at at least two guide surfaces of a guide arrangement, for producing a relative advance movement (X axis) between spectacle lens and lathe tool, which advance movement extends transversely to the feed movement and defines therewith a processing plane (F-X plane), in which engagement between lathe tool and spectacle lens takes place for the processing. In order to achieve a very compact and stiff design of the machine the guide arrangement is so mounted on the machine housing that the processing plane extends between the two guide surfaces.

Variations and modifications are possible without departing from the scope and spirit of the present invention as defined by the appended claims.

The invention claimed is:

1. A machine for processing optical workpieces, of plastics material, comprising a machine housing enclosing a working space, which lies between a workpiece spindle, which is arranged at the machine housing and by way of which the workpiece is drivable to rotate about a workpiece axis of rotation, and a fast-tool servo, which is arranged at the machine housing, for producing an oscillating feed movement of a lathe tool in the direction of the workpiece, wherein provided for the workpiece spindle or the fast-tool servo is a drivable carriage, which is guided by at least two guide surfaces of a guide arrangement and by way of which a relative advance movement between workpiece and lathe tool can be produced, the advance movement running transversely to the feed movement and defining therewith a processing plane in which engagement between lathe tool and workpiece takes place for the processing, and wherein the guide arrangement is mounted on the machine housing such that the processing plane extends between the two guide surfaces.

2. A machine according to claim 1, wherein the carriage is substantially O-shaped as seen in cross-section and has a central receiving space for the workpiece spindle.

3. A machine according to claim 2, wherein the carriage is drivable by a linear motor comprising a primary part with coils and a secondary part with magnet plates and wherein the primary part is attached to the machine housing in long-stator format, whereas the secondary part is mounted on the carriage.

4. A machine according to claim 3, wherein the guide arrangement comprises two guide rails, which are mounted on the machine housing and which each form at least one of the guide surfaces, and at least two guide shoes, which are attached to the carriage and which are each associated with a respective one of the guide rails.

5. A machine according to claim 4, wherein as seen in the direction of a center axis of the machine housing one of the guide rails is arranged axially at the height of the linear motor and/or the other guide rail is arranged on a side of the linear motor remote from the working space.

6. A machine according to claim 5, wherein the fast-tool servo is thermally conductively connected with the machine housing and statically fixed in place on either side of the processing plane by way of fasteners.

7. A machine according to claim 6, wherein the working space bounded by the machine housing has a substantially circular cross-section as seen in a section perpendicular to the center axis of the machine housing.

8. A machine according to claim 7, wherein the machine housing has a housing section at the workpiece side and a housing section at the tool side, the housing sections being constructed integrally or as separate parts connected together directly or indirectly.

9. A machine according to claim 8, wherein the housing section at the tool side has a tubular, substantially hollow-cylindrical section for reception of the fast-tool servo and a tubular, substantially hollow-cylindrical outer section surrounding the inner section, the inner and outer sections being connected together by way of webs extending in spoke form.

10. A machine according to claim 9, wherein the housing section at the workpiece side has a tubular, substantially hollow-cylindrical outer section surrounding two substantially block-shaped wall sections, which are arranged substantially parallel to one another and to the center axis of the machine housing and extend up to an inner circumferential surface of the outer section and which bound therebetween a receiving space for the carriage and the drive thereof.

11. A machine according to claim 10, wherein the substantially block-shaped wall sections each have an inner surface and an outer surface, which extend substantially parallel to the center axis of the machine housing and in the direction of the working space are connected with a wall disc, which bounds the working space and runs substantially perpendicularly to the center axis of the machine housing and which extends peripherally up to the inner circumferential surface of the outer section.

12. A machine according to claim 11, wherein the substantially block-shaped wall sections each form by the end faces thereof remote from the working space a respective bearing surface for the guide arrangement on either side of the processing plane.

13. A machine according to claim 11, wherein the machine housing is provided near the fast-tool servo with a cut-out for receiving a milling spindle.

14. A machine according to claim 13, wherein the workpiece spindle is longitudinally displaceable with respect to the carriage in the direction of the workpiece axis of rotation.

15. A machine according to claim 14, wherein the machine housing consists of a light-metal alloy, particularly aluminum alloy.

16. A machine according to claim 1, wherein the carriage is drivable by a linear motor comprising a primary part with coils and a secondary part with magnet plates and wherein the primary part is attached to the machine housing in long-stator format, whereas the secondary part is mounted on the carriage.

17. A machine according to claim 1, wherein the guide arrangement comprises two guide rails, which are mounted on the machine housing and which each form at least one of the guide surfaces, and at least two guide shoes, which are attached to the carriage and which are each associated with a respective one of the guide rails.

18. A machine according to claim 17, wherein as seen in the direction of a center axis of the machine housing one of the guide rails is arranged axially at the height of the linear motor and/or the other guide rail is arranged on a side of the linear motor remote from the working space.

19. A machine according to claim 18, wherein the fast-tool servo is thermally conductively connected with the machine housing and statically fixed in place on either side of the processing plane by way of fasteners.

20. A machine according to claim 1, wherein the working space bounded by the machine housing has a substantially circular cross-section as seen in a section perpendicular to the center axis of the machine housing.

21. A machine according to claim 1, wherein the machine housing has a housing section at the workpiece side and a housing section at the tool side, the housing sections being constructed integrally or as separate parts connected together directly or indirectly.

22. A machine according to claim 21, wherein the housing section at the tool side has a tubular, substantially hollow-cylindrical section for reception of the fast-tool servo and a tubular, substantially hollow-cylindrical outer section surrounding the inner section, the inner and outer sections being connected together by way of webs extending in spoke form.

23. A machine according to claim 22, wherein the housing section at the workpiece side has a tubular, substantially hollow-cylindrical outer section surrounding two substantially block-shaped wall sections, which are arranged substantially parallel to one another and to the center axis of the machine housing and extend up to an inner circumferential surface of the outer section and which bound therebetween a receiving space for the carriage and the drive thereof.

24. A machine according to claim 23, wherein the substantially block-shaped wall sections each have an inner surface and an outer surface, which extend substantially parallel to the center axis of the machine housing and in the direction of the working space are connected with a wall disc, which bounds the working space and runs substantially perpendicularly to the center axis of the machine housing and which extends peripherally up to the inner circumferential surface of the outer section.

25. A machine according to claim 23, wherein the substantially block-shaped wall sections each form by the end faces thereof remote from the working space a respective bearing surface for the guide arrangement on either side of the processing plane.

26. A machine according to claim 1, wherein the machine housing is provided near the fast-tool servo with a cut-out for receiving a milling spindle.

27. A machine according to claim 1 wherein the workpiece spindle is longitudinally displaceable with respect to the carriage in the direction of the workpiece axis of rotation.

28. A machine according to claim 1, wherein the machine housing is made from a light-metal alloy, particularly aluminum alloy.

* * * * *